United States Patent [19]

Borrel et al.

[11] 3,860,495

[45] Jan. 14, 1975

[54] PROCESS FOR THE PURIFICATION OF CRUDE ACROLEIN BY EXTRACTIVE DISTILLATION

[75] Inventors: Marcel Borrel, Oullins; Henri Mathais, Ste-Foy-Les-Lyon; Marcel Thevenon, Lyon, all of France

[73] Assignee: Produits Chimiques Ugine Kuhlman, Paris, France

[22] Filed: June 8, 1970

[21] Appl. No.: 44,165

[30] Foreign Application Priority Data
June 9, 1969 France .............................. 69.18905

[52] U.S. Cl. ........................ 203/17, 203/39, 203/63, 203/64, 203/98, 203/99, 203/84, 260/601 R
[51] Int. Cl. ........................ B01d 3/40, C07c 47/22
[58] Field of Search ............. 260/601 R; 203/17, 39, 203/43, 63, 64, 98, 99 S, DIG. 19, 91, 71; 202/204

[56] References Cited
UNITED STATES PATENTS

| | | | |
|---|---|---|---|
| 2,194,851 | 3/1940 | Guinot................................ | 202/204 |
| 2,542,752 | 2/1951 | Cole..................................... | 203/17 |
| 2,574,935 | 11/1951 | Pierotti et al. ................... | 260/601 R |
| 2,767,216 | 10/1956 | Evans et al....................... | 260/601 R |
| 2,791,550 | 5/1957 | West et al............................. | 203/39 |
| 3,149,055 | 9/1964 | Houghland........................... | 203/98 |
| 3,220,932 | 11/1965 | Crandall ............................. | 203/35 |
| 3,445,347 | 5/1969 | Borrel et al......................... | 203/98 |
| 3,507,755 | 4/1970 | Bitners et al....................... | 203/98 |

Primary Examiner—Wilbur L. Bascomb, Jr.
Attorney, Agent, or Firm—Pennie & Edmonds

[57] ABSTRACT

In the process for the purification of crude acrolein which comprises feeding crude acrolein containing at least water as an impurity and an extraction agent into a distillation column, condensing the vapor phase anhydrous acrolein formed at the head of the column, recycling part of the condensate into the column as reflux, withdrawing that part of the condensate not recycled as end-product, withdrawing from the base of the column, a liquid phase consisting essentially of a mixture of extraction agent and water, distilling the liquid phase withdrawn from the base of the column to remove the water and recycling the recovered anhydrous extraction agent, the improvement which comprises:

drawing-off a liquid phase consisting essentially of acrolein, extraction agent and water through an outlet situated between the crude acrolein inlet and the base of the column, the extraction agent characterized by possessing the ability to separate the water and impurity associated with the crude acrolein and having a boiling point in excess of water;

separating the liquid phase withdrawn from said outlet into an acrolein-rich upper layer and an aqueous lower layer;

recycling the acrolein-rich upper layer into the column;

discharging the aqueous lower layer; drawing-off liquid phase anhydrous extraction agent from the base of the column; and recycling the liquid phase anhydrous extraction agent into the column.

11 Claims, 2 Drawing Figures

PROCESS FOR THE PURIFICATION OF CRUDE ACROLEIN BY EXTRACTIVE DISTILLATION

DISCUSSION OF THE PRIOR ART

The drying of acrolein is rendered difficult by the existence of an acrolein-water azeotrope and by the highly reactive nature of acrolein. A number of different processes have been proposed for achieving this dryness but none of them, for the reasons which follow, can be considered satisfactory.

The simplest of these proposed processes for the drying of acrolein comprises distilling acrolein under reduced pressure. Unfortunately, the magnitude of the drying effect, which increases as distillation pressure decreases, requires large distillation and condensation equipment and the use of low operating temperatures as a greater degree of dryness is sought. For example, at a distillation pressure of 50 mm Hg, acrolein is obtained which still contained 0.4 percent water by weight. This degree of drying is often considered insufficient.

Other known processes result in a dilute solution of acrolein in a non-aqueous solvent, and possibly containing water. Accordingly, an additional separation must be conducted in order to obtain pure anhydrous acrolein.

It is also known that anhydrous acrolein can be obtained from a mixture of acrolein, propionaldehyde and water by means of an extraction distillation employing a monohydric or polyhydric alcohol as the extraction agent. In such a process, the extraction agent reacts chemically with propionaldehyde and the reaction is catalyzed by such acids as sulfuric or phosphoric acid. Elimination of the propionaldehyde and most of the water is accomplished only at the expense of a substantial loss of acrolein, generally exceeding 10 percent of the acrolein fed into the extraction distillation column. Moreover, the product recovered at the bottom of the extraction column contains a mixture of the extraction agent, water and the reaction products of solvent with propionaldehyde. Recovery of the solvent can be neither complete nor carried out without employing subsequent purification steps, the result of which is to complicate the process and increase cost.

SUMMARY OF THE INVENTION

The present invention broadly relates to an improved process for the extraction of water and other impurities from crude acrolein utilizing an extraction agent, such as a monohydric or polyhydric alcohol, which permits both separate and simultaneous recovery of substantially anhydride acrolein and of the substantially anhydrous extractant in a single step in a more economical and efficient manner.

DETAILED DESCRIPTION OF THE INVENTION

Figure 2:
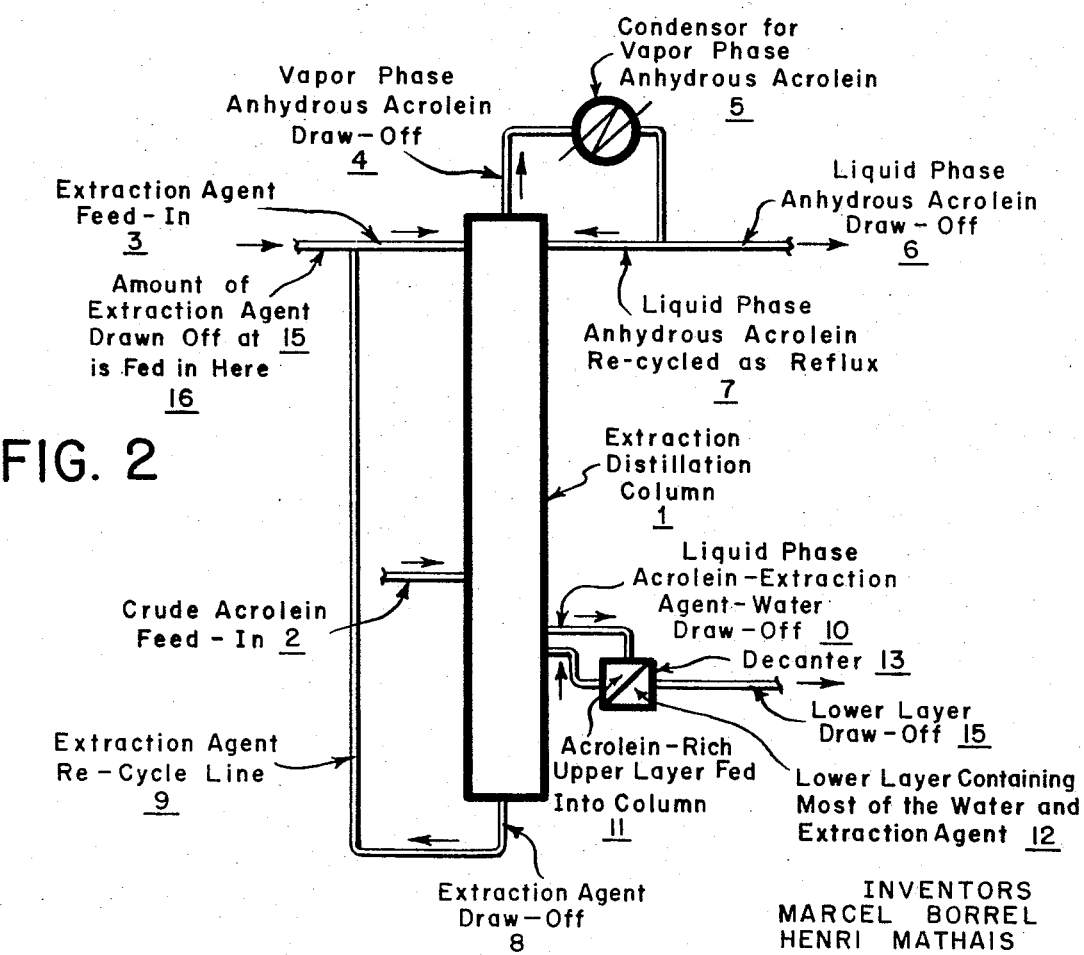

According to the process of this invention, crude acrolein is introduced into a distillation column 1 at inlet 2 as shown in FIG. 2, the acrolein containing at least water as an impurity and probably also containing other impurities, such as propionaldehyde, acetone, acetaldehyde, formaldehyde and similar carbonyl compounds. An extraction agent is fed into the head of the column at inlet 3. Practically anhydrous acrolein in vapor phase is withdrawn at the head of the distillation column at outlet 4 and fed into the condensor 5. Part of the condensate, consisting of practically anhydrous acrolein in liquid phase, is withdrawn and reintroduced into the head of the column at inlet 7 to serve as a reflux. The extraction agent, in liquid phase, is withdrawn at the base of the column at outlet 8 and is sufficiently anhydrous to be recycled through line 9 and reintroduced into the column at the head at inlet 3. Situated between inlet 2 and the base of the column, a liquid phase is present which consists of acrolein, the extraction agent and nearly all the water to be separated. This liquid phase is withdrawn at outlet 10, cooled, and fed into a decantor 13 where it separates into two layers. The upper layer 11 which is mainly acrolein is re-fed into the column at inlet 14 which is situated somewhere beneath outlet 10. The lower layer 12, mainly consisting of water with a small fraction of the extraction agent, is drawn off at outlet 15. An amount of extraction agent equal to that amount of agent drawn off at 15 can be fed through the line 16 to the head of the column at inlet 3 to make up for the loss of extractant. A standard distillation column can be used with the modifications shown in FIG. 2. The boiler at the base of the column is not shown. By well known means it evolves enough heat to cause the evolving of the extraction agent vapors from the liquid phase situated at the base of the column.

The modifications brought to the standard distillation column are constituted by an outlet 10, a decantor 13, an outlet 15 to extract the lower liquid layer out of said decantor and an inlet 11 to allow the upper layer to be re-fed into the column after removing from said decantor.

The working of the column is modified: as said hereabove a liquid layer appears between outlet 10 and inlet 11, containing some acrolein, nearly all the water and various impurities; this layer is heated by vapors rising from the base of the column, and causes the formation of a vapor mixture of its constituents; said liquid layer, as said hereabove, is withdrawn at outlet 10, cooled and fed into decantor 13 where it separates into two layers.

Separation effectiveness and purity of acrolein head product, is improved if the number of plates above the inlet 2 at which crude acrolein is fed into the column and the ratio of extraction agent to the water to be removed are increased and part of the condensate which consists of practically anhydrous acrolein is fed into the top of the column for reflux. These optimums of these variables can be determined by one skilled in the art for any particular crude acrolein being purified according to this invention, bearing in mind the particular pressures and temperatures used in the column and the phase diagram shown in FIG. 1. The amount of reflux can vary from 5 to 50 percent of the acrolein condensate.

A remarkable feature of the invention resides in the fact that by withdrawing the water containing liquid phase present at an outlet situated between the crude acrolein feed-in and the base of the column, a mixture is obtained which separates into two layers and by recycling the upper layer 11 at a select site, acrolein and extraction solvent, both practically anhydrous, are simultaneously obtained. Recycling the upper layer 11 does not interfere with the effective operation of the column.

Figure 1:
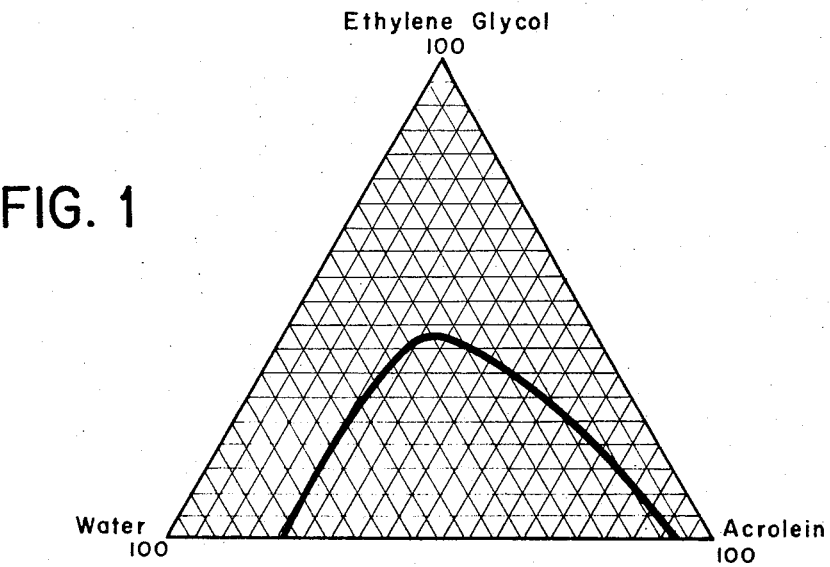

The site of the outlet from which the aforementioned liquid phase can be withdrawn will depend mainly on two parameters, namely the composition of the phase or crude acrolein and its temperature. FIG. 1 of the drawing shows for example, the ternary liquid equilibrium diagram for ethylene glycol-acrolein-water at 20°C., this diagram making it possible to select the optimum site for the outlet. Fixing a temperature at which the two layers of the liquid phase are to be separated, and utilizing the ternary liquid-liquid diagram, the outlet should be selected so that withdrawing the liquid phase will result in two layers, the weight ratio and respective composition of which entail minimum acrolein and ethylene glycol loss. The site of the inlet through which the upper layer 11 is reintroduced into the column is selected at a point below the outlet from which the liquid phase is withdrawn, for example, at the plate immediately below the outlet from which the liquid phase is withdrawn or between this point and the fifth plate counted down from such point.

Various extraction agents can be used according to this invention as long as they are capable of separating the water and other impurities from the crude acrolein, have a boiling point in excess of water so that the liquid extractant can be recovered at the bottom of the column in substantially anhydrous form etc. as will be apparent to those skilled in the art. Some examples of extraction agents which have been found to be particularly advantageous include monohydric alcohols, such as isobutyl alcohol and secondary butyl alcohol and polyhydric alcohols, such as the diols, including ethylene glycol and propylene glycol.

The quantity of extraction agent that can be employed in the practice of this invention can of course be varied but a range between 5 parts and 100 parts by weight of water to be extracted can generally be employed. 10 and 80 parts of extractant have been found to be advantageous.

Although the process may be conducted at atmospheric pressure, it is advantageous to employ reduced pressure. It is however unnecessary to work at very low pressures. Pressures of 200 to 500mm Hg are perfectly suitable but pressures outside this range are also operable.

The temperature curve of the column will depend on the distillation pressure. Generally, temperatures ranging between 120° and 200°C. (depending on the boiling point of the extractant being used) at the base of the column and between 20° and 53°C. at the head are employed. Further to illustrate this invention, specific examples are described hereinbelow, the first example describing a process known to the art and provided here for purposes of comparison with the present invention.

The process of the instant invention will purify crude acrolein produced by known processes. The crude acrolein purifed in the disclosed process is advantageously prepared commercially by (1) catalytically oxidizing vaporized propylene in air at 250°–500°C over a catalyst having a metallic oxide base consisting of the oxides of tin and antimony or of molybdenum and bismuth or (2) cross-condensing acetaldehyde with formaldehyde at 300°–350°C over a catalyst such as lithium phosphate on activated alumina. These two commercial processes, which are described at pages 266–270 of the Kirk-Othmer *Encyclopedia of Chemical Technology*, Second Edition, Volume 1, both produce a crude acrolein product containing acrolein, water, and small amounts of other by-products, and therefore further processing is necessary to realize anhydrous acrolein.

One of the largest uses of acrolein is in the production of methionine, which is used as a constituent of many animal feeds. *Encyclopedia*, supra, at page 271, describes the following process for producing methionine:

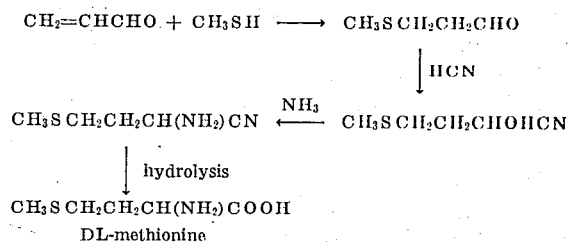

EXAMPLE I — PRIOR ART PROCESS

In this known method, the only outlets from which the contents of the distillation column may be withdrawn are situated at the head and base of the column. This column was fed to approximately one-third of its height with crude acrolein containing 92 parts acrolein and 8 parts water by weight. Ethylene glycol containing 0.5 percent water was fed into the column at the head in a ratio of 4:1 by weight of crude acrolein. Pressure was maintained at 300mm Hg. The vapor phase at the head of the column was withdrawn and condensed with about one-third condensate taken at the purified product and the remaining two-thirds recycled as reflux.

The condensate consisted of acrolein containing less than 0.2 percent water. At the base of the column, ethylene glycol and nearly all the water which had been present in the crude acrolein was collected. In order to recylcle the ethylene glycol, it had to undergo a separate distillation for the removal of water.

EXAMPLE II

The distillation column employed in Example I, modified according to the teaching of this invention, was operated under the same conditions as before, i.e., identical glycol, distillation pressure and reflux rate. But proceeding according to the invention, the liquid phase present between the crude acrolein inlet and the base of the column was withdrawn through an outlet whose site was selected as hereinbefore disclosed. This liquid phase was cooled and separated into two layers. The acrolein-rich upper layer was re-fed into the column through an inlet whose site was situated between the outlet from which the liquid phase was withdrawn and the base of the column. The lower layer, consisting of nearly all the water originally present in the crude acrolein along with a small amount of acrolein and ethylene glycol, was withdrawn. The condensate obtained from the vapor phase drawn-off at the head of the column consisted of acrolein containing less than 0.2 percent water; no ethylene glycol was detected in this condensate. Practically pure anhydrous ethylene glycol was recovered at the base of the column and recycled. Yield was 97 percent in the case of anhydrous acrolein and 99 percent in the case of ethylene glycol.

EXAMPLE III

The distillation column was fed to approximately one-third of its height with crude acrolein containing 97.2 parts acrolein and 2.8 parts water by weight. Ethylene glycol was fed into the column at the head in a ratio of 1:2 by weight of crude acrolein. Pressure was maintained at 400mm Hg. Temperature was 183°C. at the base and 38°C. at the head.

The liquid phase present between the crude acrolein inlet and the base of the column was withdrawn from an outlet whose site was selected as in Example II, cooled and separated into two layers. The acrolein-rich upper layer was re-fed into the column through an inlet whose site was situated at the plate immediately below the outlet from which the liquid phase was withdrawn. The lower layer which was discharged from the decantor was analyzed to contain the following by weight: 67 percent water, 21 percent acrolein, 1 percent ethylene glycol and 1 percent miscellaneous impurities. Practically pure anhydrous ethylene glycol was recovered at the base of the column and recycled. The condensate obtained at the head contained 99.6 percent acrolein, 0.1 percent water and 0.3 percent miscellaneous impurities by weight; no ethylene glycol was detected in the condensate. Reflux rate (condensate withdrawn/ condensate recycled) was 30 percent. The recovery yield was 99 percent in relation to acrolein and ethylene glycol.

We claim:

1. In a process for the purification of crude acrolein which comprises feeding crude acrolein containing at least water as an impurity and an extraction agent into a distillation column, distilling the crude acrolein feed mixture condensing the vapor phase anhydrous acrolein formed at the head of the column, recycling part of the condensate not recovered as end-product, withdrawing from the base of the column a liquid phase consisting essentially of a mixture of extraction agent and water, distilling the liquid phase withdrawn from the base of the column to remove the water and recycling the recovered anhydrous extraction agent, the improvement which comprises:

drawing-off a liquid phase consisting essentially of acrolein, extraction agent and water through an outlet situated between the crude acrolein inlet and the base of the column, the extraction agent characterized by possessing the ability to extract acrolein from the crude acrolein and having a boiling point in excess of that of water;

separating the liquid phase withdrawn from said outlet into an acrolein-rich upper layer and an aqueous lower layer;

recycling the acrolein-rich upper layer into the column;

discharging the aqueous lower layer; drawing-off liquid phase anhydrous extraction agent from the base of the column; and recycling the liquid phase anhydrous extraction agent into the column.

2. The process of claim 1 wherein the extraction agent consists essentially of a monohydric or polyhydric alkanol.

3. The process of claim 2 wherein the extraction agent is ethylene glycol.

4. The process of claim 1 wherein the distillation is conducted at atmospheric pressure.

5. The process of claim 1 wherein the distillation is conducted at a pressure ranging between 200 to 500mm Hg.

6. The process of claim 1 wherein temperatures ranging between 120° and 200°C. at the base of the column and between 20° and 45°C. at the head are employed.

7. A process for the purification of crude acrolein which comprises feeding crude acrolein containing at least water as an impurity and a monohydric or polyhydric alkanol as an extraction agent into a distillation column, the extraction agent characterized by possessing the ability to extract acrolein from the crude acrolein and having a boiling point in excess of that of water, vaporizing the acrolein in the distillation column so that it rises to the top of the column in substantially the anhydrous state, maintaining a portion in the distillation column at an intermediate level below the zone of introduction of the crude acrolein and extraction agent but above the bottom of the column at a temperature so that the water and alcohol extraction agent and some of the acrolein are in the liquid state, maintaining the bottom of the distillation column at a temperature above the vaporization point of water but below the vaporization temperature of the alcohol extraction agent so as to maintain the alcohol extraction agent at the bottom of the column in the liquid substantially anhydrous state, and withdrawing the liquid phase of water, extraction agent and acrolein from said intermediate point in the distillation column, the substantially anhydrous acrolein from the top of the column and the substantially anhydrous extraction agent from the bottom of the column.

8. The process according to claim 7 in which the crude acrolein is introduced into the distillation column below the top thereof and the extraction agent is introduced above the point of introduction of the crude acrolein and the liquid water containing phase is withdrawn from the column below the point of introduction of the crude acrolein.

9. The process according to claim 8 in which the anhydrous extraction agent is removed from the bottom of the column and recycled for introduction into the column at a point above that of the crude acrolein.

10. The process according to claim 9 in which the substantially anhydrous vaporized acrolein is removed from the head or top of the column, condensed and a portion thereof recycled and introduced into the column above the point of introduction of the crude acrolein.

11. The process according to claim 10 in which the acrolein and extraction agent are recovered from the withdrawn liquid phase and the acrolein and extraction agent recycled to the column at a point below the point of withdrawal of the liquid phase of water.

* * * * *